Patented Oct. 17, 1939

2,176,457

UNITED STATES PATENT OFFICE 2,176,457

STABLE HETEROATOMIC MERCURI MERCAPTO COMPOUNDS AND WATER SOLUBLE SALTS THEREOF

Russel J. Fosbinder, Short Hills, and Lewis A. Walter, East Orange, N. J., assignors to The Maltbie Chemical Company, Newark, N. J., a corporation of New Jersey No Drawing. Application September 15, 1937, Serial No. 163,956

8 Claims. (Cl. 260—270)

This invention relates to organic mercury compounds useful as antiseptics, germicides and bactericides, and, more particularly, to mercurimercapto compounds of that character. A principal object of the invention is to provide new and useful compounds of the type indicated, and which are either themselves water-soluble, or which have water-soluble salts, or both, and which are stable toward oxidation by oxygen, even in the presence of metal ion catalysts.

Another object of the invention is to provide new and useful water soluble salts, such as the alkali metal and ammonium salts, and the alkylamine salts and alkanolamine salts, of such compounds, which salts, in water solution of suitable concentration, have novel and valuable bactericidal and antiseptic properties.

Still another object of the invention is the provision of certain new and useful antiseptic, germicidal and bactericidal alkyl-mercuri-mercapto compounds containing a heteroatomic ring having one nitrogen atom, the other atoms of the ring being carbon, the alkyl-mercuri radical of the compound being linked to one of the carbon atoms of the ring through a sulfur atom, said compounds being stable toward free oxygen even at relatively elevated temperatures and even in the presence of metal ion catalysts. Such compounds are also, preferably, provided with an acidic group attached to still another carbon atom of the ring by replacement of a hydrogen atom, in order to impart water soluble properties to the salts of the compound, and such acidic group is, in the preferred compounds, a carboxylic group.

A still further object of the invention is the provision of new and useful water-soluble salts of the foregoing compounds, exemplified by the alkali-metal, ammonium, and alkylamine and alkanolamine salts thereof, which salts have excellent new and useful antiseptic, germicidal and bactericidal properties when employed in aqueous solutions of suitable concentration.

Other objects of the invention will appear from the following description.

Mercuri-mercapto compounds are desirable as antiseptics and germicides for many purposes, by reason of the fact that the mercapto group tends to induce increased cell proliferation, and various compounds of that type have been used or proposed in medicine to promote the healing of wounds, ulcers, and open infections or the like. On the other hand, mercury tends to exert a toxic effect on the regeneration of tissue. Hence, by combining the two effects it has been attempted to have the former counteract the latter, to the end that cell proliferation might be enabled to proceed at a more normal rate in the presence of an antiseptic of the kind referred to. However, most mercapto compounds are susceptible to oxidation by oxygen,—so much so that the presence of even a very minute amount of a metallic ion catalyst, particularly the copper ion, but also manganese or others, results in rapid deterioration of the compound, with resulting less of antiseptic efficiency and other undesirable properties of the deteriorated or oxidized material. In the past, this susceptibility to oxidation and deterioration has seriously affected the usefulness of mercuri-mercapto compounds when sought to be used as antiseptics, since by reason of the dilution required in therapeutic applications (necessitated by the relatively high toxicity of the mercury), and the alkalinity of the solution necessary to prevent precipitation of the corresponding acid compound, the deterioration is marked and rapid even though the content of copper ions in the solution is as little as one part in one million; while other metal ion catalysts are almost equally deleterious. Further, it is impractical, if not actually impossible to prepare such compounds and their solutions entirely free from copper, while manganese and iron, also difficult to eliminate, also cause deterioration, although to a somewhat less degree.

The present invention, however, provides a class or series of new and useful mercurimercapto compounds which are not only active and effective as antiseptics and bactericides, but which are also stable against oxidation by oxygen, even in the co-presence of metallic ion catalysts such as copper, iron and manganese, and even at relatively elevated temperatures. The new compounds which we have discovered, and which form the subject-matter of this application for patent, are of the general formula R—Hg—S—R$^1$, in which R represents an alkyl radical; Hg, mercury; S, sulfur; and R$^1$, a six-membered unsaturated heteroatomic ring containing one nitrogen atom and five carbon atoms, and linked to the R—Hg group through the sulfur atom, which latter is attached to a carbon atom of the ring by replacement of a hydrogen atom. Water-solubility is imparted to the compound by replacing an additional hydrogen atom by an acidic group, preferably a carboxylic radical, which is capable of forming water-soluble salts of the compound by replacement of the hydrogen atom of the acidic or carboxyl group. Ordinarily, the compounds themselves are not water soluble, although they may be used as germicides in alcoholic or other suitable non-aqueous solution; however, we ordinarily prefer to prepare the water-soluble salts, such as alkali metal, ammonium, or alkylamine or alkanol-amine salts thereof, or even alkaline-earth metal salts thereof, and to employ the same as antiseptics in water solution of suitable concentration.

Compounds of the above type may be suitably prepared by refluxing a mercapto-pyridine carboxylic acid, in alcohol, as ethyl alcohol, or other suitable solvent, and an ethyl, propyl, butyl or like mercuric chloride, followed by recovery of the resulting alkyl mercuri-thiopyridine carboxylic acid, as will now be shown in greater detail by the following specific examples.

EXAMPLE 1

An example illustrative of a suitable method for preparation of a preferred type of compound according to our invention is as follows:

*2-ethylmercuri thiopyridine 5-carboxylic acid*

7.8 grams of 2-mercapto pyridine 5-carboxylic acid, 50 cc. of twice normal caustic soda solution, 500 cc. of ethyl alcohol, and 13.4 grams of ethyl mercuric chloride are refluxed together for one hour. The solution is then concentrated to about half the original volume, and then diluted with water to approximately the original volume. Any unreacted ethyl mercuric chloride is thus precipitated out of the solution. The diluted solution is then cooled, filtered, and the filtrate is acidified with acetic acid until precipitation of the alkyl mercury compound is obtained. The resulting precipitate is removed by filtration and recrystallized from alcohol. The resulting compound 2-ethylmercuri thiopyridine 5-carboxylic acid, is in the form of white crystals, softening at about 210° C., and gradually decomposing at from about 250–300° C.

An analysis of the resulting compound was found to give a mercury content of 52.14%, whereas the theoretical mercury content for 2-ethylmercuri thiopyridine 5-carboxylic acid is 52.22%, showing that the preparation of the compound according to the foregoing example results in the production of substantially pure 2-ethylmercuri thiopyridine 5-carboxylic acid.

The structural formula of the compound is believed to be as follows, according to our determinations:

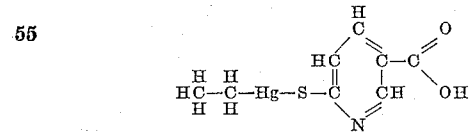

While the foregoing compound may be utilized for its germicidal properties, as in alcoholic or other suitable non-aqueous solution, we prefer to use the compound in water-soluble form, to which end a salt of the compound, rendering it water-soluble, is prepared. Thus a sodium salt of the above compound, suitable for pharmaceutical and medicinal use, may be prepared by dissolving one molecular equivalent of the mercury compound (2-ethylmercuri thiopyridine 5-carboxylic acid) in a moderately concentrated solution containing one molecular equivalent of sodium hydroxide, and then precipitating the solution of the salt with 95% ethyl alcohol, filtering and drying.

The resulting sodium salt is water soluble and may be dissolved in water and used for its germicidal or antiseptic properties in suitable concentrations; for example a water solution having a concentration of 1 part of the salt to 1000 parts of water has been found to have excellent germicidal properties.

The ammonium salt of 2-ethylmercuri thiopyridine 5-carboxylic acid may be prepared by dissolving one molecular equivalent of the mercury compound (2-ethylmercuri thiopyridine 5-carboxylic acid) in a moderately concentrated solution containing one molecular equivalent of ammonium hydroxide. The salt is then precipitated from the aqueous solution by a suitable non-aqueous solvent, filtered and dried.

The resulting ammonium salt may be dissolved in water and used as a germicide at approximately the same concentration as the sodium salt.

Other salts which have been found particularly desirable for various germicidal purposes, both because of their pharmaceutical compatibility and broad range of water-solubility, are the alkylamine salts and the alkanolamine salts.

A particular example is the ethanolamine salt having a structural formula which we have found to be as follows:

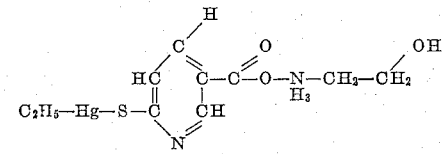

The alkylamine salts of 2-ethylmercuri thiopyridine 5-carboxylic acid may be prepared, in general, by dissolving one molecular equivalent of the mercury compound in a moderately concentrated solution containing one molecular equivalent of the alkylamine.

The ethanolamine salt may be prepared as follows: Dissolve one molecular equivalent of 2-ethylmercuri thiopyridine 5-carboxylic acid in a moderately concentrated solution containing one molecular equivalent of ethanolamine. The resulting solution may be used in suitable concentrations, as before.

Further examples of the preparation of compounds according to our invention are as follows:

EXAMPLE 2

*2 n-propylmercuri thiopyridine 5-carboxylic acid*

This compound may be prepared as follows:

7.8 grams of 2-mercapto pyridine 5-carboxylic acid, 50 cc. of twice normal caustic soda solution, 500 cc. of ethyl alcohol, and 13.5 grams of n-propyl mercuric chloride are refluxed together for one hour. The solution is concentrated to about half the original volume and diluted with water to approximately the original volume. This solution is cooled, filtered, and the filtrate acidified with acetic acid. The resulting precipitate is removed by filtration and recrystallized from alcohol. The resulting compound is found to have the form of white crystals decomposing at 205–210° C. with evolution of gas.

An analysis of the resulting compound was found to give a mercury content of 50.28%, whereas the theoretical mercury content for 2 n-propylmercuri thiopyridine 5-carboxylic acid is 50.37%, showing that the preparation of the compound according to the foregoing example results in the production of substantially pure 2 n-propylmercuri thiopyridine 5-carboxylic acid.

Aqueous solutions of the various water-soluble salts of the 2 n-propylmercuri thiopyridine 5-carboxylic acid resulting from the foregoing procedure may be prepared in manner similar to the directions given in Example 1, and employed in suitable concentrations.

Still another example of the preparation of compounds according to our invention is as follows:

EXAMPLE 3

*2 n-butylmercui thiopyridine 5-carboxylic acid*

7.8 grams of 2-mercapto pyridine 5-carboxylic acid, 50 cc. of twice normal caustic soda solution, 500 cc. of ethyl alcohol, and 14 grams of n-butylmercuric chloride are refluxed together for one hour. The solution is then concentrated to about one-half the original volume, and then diluted with water to approximately the original volume. This solution is chilled, filtered, and the filtrate acidified with acetic acid. The resulting precipitate is recrystallized from alcohol. The resulting white crystals are found to decompose at about 185–190° C. with the evolution of gas.

An analysis of the resulting compound was found to give a mercury content of 48.42%, whereas the theoretical mercury content for 2 n-butylmercuri thiopyridine 5-carboxylic acid is 48.69%, showing that the preparation of the compound according to the foregoing example results in the production of substantially pure 2 n-butylmercuri thiopyridine 5-carboxylic acid.

Aqueous solutions of the various water-soluble salts of the 2 n-butylmercuri thiopyridine 5-carboxylic acid resulting from the foregoing procedure may be prepared in manner similar to that already described in the case of the 2-ethylmercuri thiopyridine 5-carboxylic acid and may then be employed as antiseptics in water solutions of suitable concentrations.

Those skilled in the art will be able, from the general description given, and the foregoing specific examples, to produce other mercury compounds similar or analogous in structure to those herein illustrated and described, and falling within the scope of our invention. Thus in certain cases it may be that amyl or other higher compounds may be used for particular purposes, and it is also possible that, under suitable circumstances, and for particular purposes, the various iso-propyl or iso-butyl compounds may be used instead of the normal compounds. Therefore, while we do not limit our generic claims to the particular or exact compounds described and illustrated above, they are, nevertheless, the best and most suitable compounds for the purpose now known to us, and are, at the present time, the preferred compounds according to our invention.

The examples and descriptions herein given are and constitute the best embodiments of our invention now known to us, but it is to be understood that the invention is not necessarily or specifically limited thereto, but may be carried out in other ways without departure from its spirit and within the following claims.

We claim:

1. Alkyl mercuri mercapto compounds of the general formula

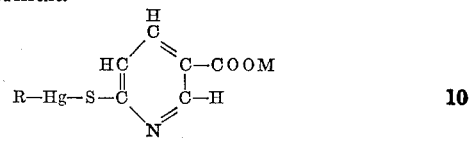

wherein R is an alkyl radical and M is a substituent selected from the group consisting of hydrogen, alkali metal, alkaline earth metal, ammonium, alkylammonium and alkanolammonium, said compounds being antiseptic and bactericidal and stable toward free oxygen even at elevated temperatures and in the presence of metal ion catalysts.

2. A water-soluble salt of a compound as defined in claim 1.

3. An alkali-metal salt of a compound as defined in claim 1, such salt being water-soluble.

4. An alkylammonium salt of a compound as defined in claim 1, such salt being water-soluble.

5. A water-soluble alkanolammonium salt of a compound as defined in claim 1.

6. An antiseptic and bactericidal compound, soluble in water and having the structural formula:

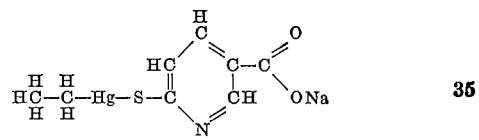

7. An antiseptic and bactericidal compound, soluble in water and having the structural formula:

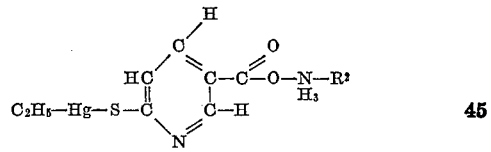

where $R^2$ is an alkyl radical.

8. An antiseptic and bactericidal compound, soluble in water and having the structural formula:

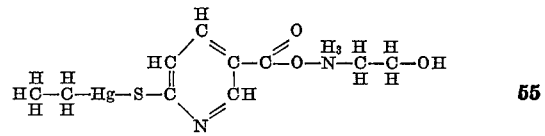

RUSSEL J. FOSBINDER.
LEWIS A. WALTER.